(12) United States Patent
Fernandez

(10) Patent No.: US 7,747,466 B2
(45) Date of Patent: Jun. 29, 2010

(54) METHODS FOR DISTRIBUTIONS OF DIGITAL FILES

(75) Inventor: Alvaro Fernandez, Barcelona (ES)

(73) Assignee: Media Patents, S.L., Barcelona (ES)

( * ) Notice: Subject to any disclaimer, the term of this patent is extended or adjusted under 35 U.S.C. 154(b) by 0 days.

(21) Appl. No.: 12/107,028

(22) Filed: Apr. 21, 2008

(65) Prior Publication Data

US 2008/0250029 A1 Oct. 9, 2008

Related U.S. Application Data

(63) Continuation of application No. PCT/EP2007/005049, filed on Jun. 7, 2007.

(51) Int. Cl.
*G06Q 30/00* (2006.01)
(52) U.S. Cl. ............... 705/14.47; 705/14.4; 705/58
(58) Field of Classification Search .............. 705/14.47, 705/14.4, 58
See application file for complete search history.

(56) References Cited

U.S. PATENT DOCUMENTS

| | | | |
|---|---|---|---|
| 4,916,747 A | | 4/1990 | Arimoto |
| 5,297,071 A | | 3/1994 | Sugino |
| 5,815,665 A | | 9/1998 | Teper et al. |
| 5,855,008 A | | 12/1998 | Goldhaber et al. |
| 6,009,525 A | * | 12/1999 | Horstmann ............... 726/22 |
| 6,073,124 A | | 6/2000 | Krishnan et al. |
| 6,324,658 B1 | | 11/2001 | Jasperneite et al. |
| 6,363,356 B1 | * | 3/2002 | Horstmann ............... 705/14 |
| 6,436,230 B1 | | 8/2002 | Kondo et al. |
| 6,452,903 B1 | | 9/2002 | Peck et al. |
| 6,522,866 B1 | | 2/2003 | Merkle et al. |
| 6,535,871 B1 | | 3/2003 | Romansky et al. |
| 6,640,093 B1 | | 10/2003 | Wildhagen |
| 6,654,754 B1 | | 11/2003 | Knauft et al. |
| 6,697,944 B1 | | 2/2004 | Jones et al. |
| 6,704,733 B2 | | 3/2004 | Clark et al. |

(Continued)

FOREIGN PATENT DOCUMENTS

EP 1243998 A1 9/2002

(Continued)

OTHER PUBLICATIONS

"Implementation of the agent based digital rights management system for interaction on the Web", published in Proceedings of the IASTED International Conference Internet and Multimedia Systems, conference article from conference held Aug. 13-16, 2008 in Honolulu, HI, USA.

(Continued)

*Primary Examiner*—Michael Bekerman
(74) *Attorney, Agent, or Firm*—Peter B. Scull; Kristina M. Kalan; Tim Kitchen

(57) ABSTRACT

The invention relates to a process for distributing files, having the steps of receiving at least one digital file, transmitting the digital file to a location, and selecting at least one content provider. The process also has the steps of updating a content of the content provider to provide a reference to the digital file at the location, generating an updated digital file by adding information which identifies the content provider to the digital file when the reference to the digital file is selected at the content provider, and transmitting at least a portion of the at least one updated digital file to a client network.

16 Claims, 3 Drawing Sheets

U.S. PATENT DOCUMENTS

| | | |
|---|---|---|
| 6,766,064 B1 | 7/2004 | Langan et al. |
| 6,772,340 B1 | 8/2004 | Peinado et al. |
| 6,775,655 B1 | 8/2004 | Peinado et al. |
| 6,871,220 B1 | 3/2005 | Rajan et al. |
| 6,947,981 B2 | 9/2005 | Lubbers et al. |
| 6,981,217 B1 | 12/2005 | Knauft et al. |
| 6,996,544 B2 | 2/2006 | Sellars et al. |
| 7,007,042 B2 | 2/2006 | Lubbers et al. |
| 7,024,393 B1 | 4/2006 | Peinado et al. |
| 7,036,011 B2 | 4/2006 | Grimes et al. |
| 7,051,005 B1 | 5/2006 | Peinado et al. |
| 7,054,443 B1 | 5/2006 | Jakubowski et al. |
| 7,065,507 B2 | 6/2006 | Mohammed et al. |
| 7,103,351 B2 | 9/2006 | Chaudhari et al. |
| 7,103,574 B1 | 9/2006 | Peinado et al. |
| 7,103,645 B2 | 9/2006 | Leighton et al. |
| 7,110,982 B2 | 9/2006 | Feldman et al. |
| 7,120,250 B2 | 10/2006 | Candelore |
| 7,152,091 B2 | 12/2006 | Kuriyama |
| 7,188,342 B2 * | 3/2007 | DeMello et al. ............... 705/27 |
| 7,200,575 B2 | 4/2007 | Hans et al. |
| 7,249,060 B2 | 7/2007 | Ling |
| 7,373,391 B2 | 5/2008 | Iinuma |
| 2002/0091584 A1 | 7/2002 | Clark et al. |
| 2002/0133518 A1 | 9/2002 | Landsman et al. |
| 2003/0046367 A1 | 3/2003 | Tanaka |
| 2004/0003398 A1 | 1/2004 | Donian et al. |
| 2004/0059708 A1 | 3/2004 | Dean et al. |
| 2004/0088349 A1 | 5/2004 | Beck et al. |
| 2004/0093327 A1 | 5/2004 | Anderson et al. |
| 2004/0139204 A1 | 7/2004 | Ergezinger et al. |
| 2004/0143667 A1 | 7/2004 | Jerome |
| 2005/0004873 A1 | 1/2005 | Pou et al. |
| 2005/0021467 A1 | 1/2005 | Franzdonk |
| 2005/0144136 A1 | 6/2005 | Murashita |
| 2005/0288999 A1 | 12/2005 | Lerner et al. |
| 2006/0031175 A1 | 2/2006 | Sellars et al. |
| 2007/0038567 A1 * | 2/2007 | Allaire et al. ................. 705/50 |
| 2007/0067495 A1 | 3/2007 | Levy |
| 2007/0162560 A1 | 7/2007 | Jin |
| 2007/0168294 A1 | 7/2007 | Tsurukawa |
| 2008/0027750 A1 | 1/2008 | Barkeloo et al. |
| 2008/0077478 A1 * | 3/2008 | Kim ............................ 705/14 |
| 2008/0114695 A1 | 5/2008 | Gutierrez |

FOREIGN PATENT DOCUMENTS

| | | |
|---|---|---|
| EP | 1641263 A2 | 3/2006 |
| KR | 2003075948 A | 9/2003 |
| WO | 2008/055562 A1 | 5/2008 |

OTHER PUBLICATIONS

Alapan Arnab & Andrew Hutchison, "Verifiable Digital Object Identify System," published in DRM '06, Oct. 30, 2006, by the Association for Computing Machinery (ACM), in Alexandria, VA, USA.

Paskin, "The Digital Object Identifier Systems: Digital Technology Meets Content Management," Interlending & Document Supply, 1999, vol. 27, Issue 1, pp. 13-16.

Liu et al., "Digital Rights Management for Content Distribution," Australasian Information Security Workshop 2003, in Adelaide, Australia, in 2003.

Jaime Delgado & Isabel Gallego, "Standardisation Of The Management Of Intellectual Property Rights In Multimedia Content," IEEE Proceedings of the Second International Conference on WEB Delivering of Music, Jan. 2002.

Gil et al., "Managing Intellectual Property Rights in the WWW: Patterns and Semantics," IEEE Proceedings of the First International Conference on Automated Production of Cross Media Content for Multi-Channel Distribution, 2005.

M2 Presswire, IOMEGA: Iomega and Reciprocal announce strategic relationship to advance secure distribution of portable content; Partnership enables consumers to transfer and bind secure downloaded content to portable Zip disks and other Iomega Products, Jun. 27, 2001.

International Search Report and Written Opinion.

Hwang et al., "Modeling and Implementation of Digital Rights," The Journal of Systems and Software 73 (2004), p. 533-549.

European Patent Office, International Search Report for International Application No. PCT/EP2007/008195, dated Dec. 28, 2007.

* cited by examiner

METHODS FOR DISTRIBUTIONS OF DIGITAL FILES

CROSS-REFERENCE TO RELATED APPLICATIONS

The present application claims priority to and the benefit of Spanish Patent Application No. ES 200700900, which was filed on Apr. 4, 2007, and PCT Application No. PCT/EP2007/005049, which is entitled "PROCESS FOR THE ON-LINE DISTRIBUTION, THROUGH A DATA NETWORK, OF DIGITAL FILES PROTECTED BY INTELLECTUAL PROPERTY RIGHTS AND COMPUTER READABLE MEDIUM CONTAINING A PROGRAM FOR CARRYING OUT SAID PROCESS," and was filed on Jun. 7, 2007, the disclosures of which are herein incorporated by reference.

BACKGROUND OF THE INVENTION

1. Field of the Invention

The invention relates generally to a method for distributing digital files in which a digital file is stored at a predetermined location, and then updated to comprise information to identify a content provider when a user selects a reference, e.g., a link, to the digital file at the content provider, e.g., at a web site of the content provider.

2. Description of the Related Art

Vendor companies that sell products through the Internet network try to increase the likelihood that their webpage readily may be found by a user that is browsing the network and is interested in such products. A known method associated with obtaining this objective includes advertising the products on content web pages that attract users who are interested in a specific type of subject matter. These content web pages may be thematic pages about video games, cinema, music, computer programs, and the like. The advertisements are provided in the form of a link pointing to the vendor company's webpage, such that when a user selects one of the links, the user is redirected to the vendor company's webpage and the latter pays a fee to the content provider of the web pages. The fee is a function of the number of selections associated with the links. Nevertheless, for this method to be effective, the vendor companies are in contact with the content web pages, and these two entities organize the manner in which the content web pages include the advertisement links, and the manner in which the fee per user selection is paid by the vendor.

A known system addresses this issue by allowing any web page to include advertisers' advertisements and to receive a fee for it. Advertisers using this system may place advertisements in web pages of a "search network," e.g., Google's™ search network, or the "content network." The "search network" is formed by web pages, for example, Google's™ search box, in which a search may be conducted in the same manner as on Google's™ webpage. When a search is conducted, normal or "organic" results appear as well as advertisements in the form of "sponsored links." The "content network" is formed by web pages in which advertisements of certain advertisers whose products are content-related appear. A known system analyzes the content of the web pages that want to host advertisements and decides which are the most appropriate for each advertisement. The advertisements contain a link to the advertiser's webpage. Each time a user selects one of these advertisements using a link, the owner of the webpage hosting the advertisement obtains a fee from the advertiser.

Nevertheless, known systems cannot effectively prevent fraudulent selections that occur when the owners of the web pages hosting the advertisements themselves select the advertisements of their own page, for the purpose of increasing the fee that the advertiser will pay the owner. Another type of fraudulent selections include a company dedicating itself to repeatedly clicking on another company's advertisement for the sole purpose of quickly reaching the maximum budget established for the advertisement, and causing the automatic deactivation thereof, thereby denying potential customers from seeing the advertisement. The problem with fraudulent selections jeopardizes both the advertisers paying for useless selections and the owners of the web pages hosting the advertisements. Consequently, many advertisers refuse to use this system or limit the amount of money they are willing to pay for the advertisements to insubstantial amounts.

Another disadvantage of known systems is that they may not respond to the specific problems involved with the sale of digital files protected by intellectual property rights. In the case of computer programs sold on-line through the Internet, a user interested in acquiring a program normally will first download a free demonstration, e.g., trial, version of the program that the user may freely use during a trial period, and then the user acquires a use license if the user chooses to purchase a license for the product. The vendor company only earns money if the user acquires a license. If its webpage receives many user visits re-sent from other web pages in which the vendor company has an advertisement, and the users download the digital files, but then choose not to acquire a license, the vendor company must compensate the advertisers for the selection despite not making a sale.

U.S. Pat. No. 6,363,356 describes a system applied to the sale of digital files protected by intellectual property rights distributed in the form of demo versions and offering a solution to the problem of fraudulent clicks. This system is also based on a plurality of webpages containing an advertisement link to the advertiser's webpage, but it allows the advertiser to pay only for the clicks that have effectively resulted in a sale. To that end, when a user clicks on an advertisement link and is redirected to the advertiser's webpage, the URL address of the webpage hosting the advertisement-link is included in the redirection. This information is received and stored by the advertiser's webpage server and is added to the digital file when the user downloads it. So when the user gets in contact again with the advertiser's webpage to purchase a use license for said file, it is possible to know what webpage the advertisement-link that brought about the purchase of the license was on.

This system is not widely used because it presents several drawbacks. A first drawback consists of the fact that it is not designed to be globally applied: each advertising company must implement its own method to be related with content webpages and to include advertisement-links therein. A second drawback of this system is that in order to add the URL address of the referrer webpage to the downloaded file, said file is encapsulated in a wrapper and said information is added in the latter. The user does not directly download the digital file he had selected, but rather the wrapper containing it. This requires carrying out a recompilation process before the download and therefore a waiting time is introduced that is too long for the normal Internet download time scale. This is the main reason that this system was never carried out to practice.

SUMMARY OF THE INVENTION

Therefore, a need has arisen for methods for distributing digital files in which an advertiser is compensated based on the sales of licenses actually made, and not based on advertising selections. A need also has arisen for methods that generally may be applied to any vendor that wants to sell its digital files through content web pages, which can be any web pages, without the vendor company being related with content web pages.

In an embodiment of the invention, a process for distributing files, the process comprising the steps of receiving at least one digital file, transmitting the at least one digital file to a predetermined location, selecting at least one content provider, updating a content of the at least one content provider to provide a reference to the at least one digital file at the predetermined location, generating at least one updated digital file by adding information which identifies the at least one content provider to the at least one digital file when the reference to the at least one digital file is selected at the content provider, and transmitting at least a portion of the at least one updated digital file to a client network.

In another embodiment of the invention, a process for distributing files comprises the steps of receiving at least one digital file, transmitting the at least one digital file to a predetermined location, selecting at least one content provider, and updating a content of the at least one content provider to provide a reference to the at least one digital file at the predetermined location, wherein the reference is configured, such that when the reference is selected by a client network, the reference activates a program which causes at least one updated digital file to be generated by adding information identifying the at least one content provider to the at least one digital file, and the updated digital file to be transmitted to the client network.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

DETAILED DESCRIPTION OF EMBODIMENTS OF THE INVENTION

Figure 1:
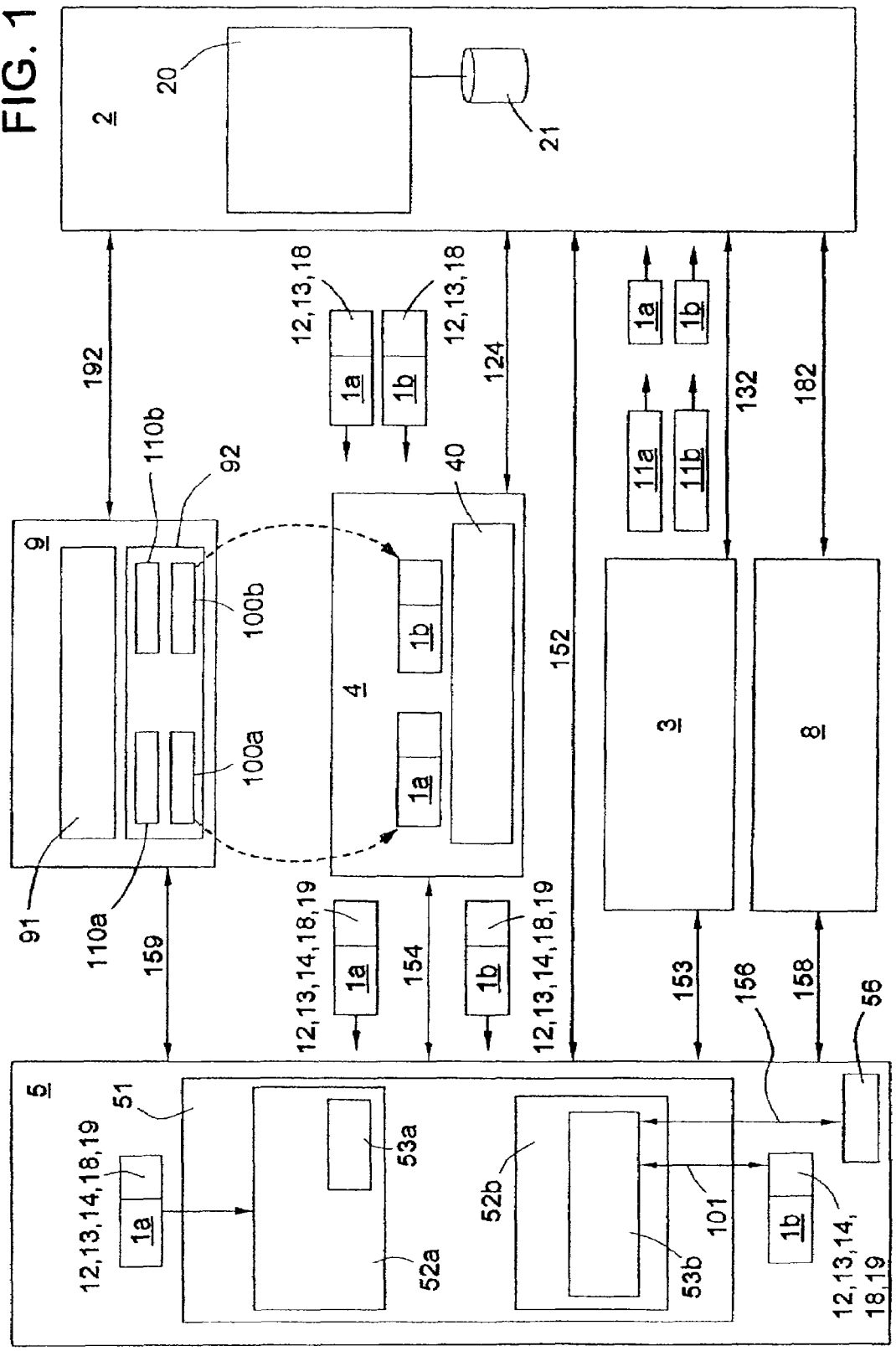
FIG. 1 is a block diagram illustrating a system for carrying out the distribution of files, according to an embodiment of the invention.
Figure 2:
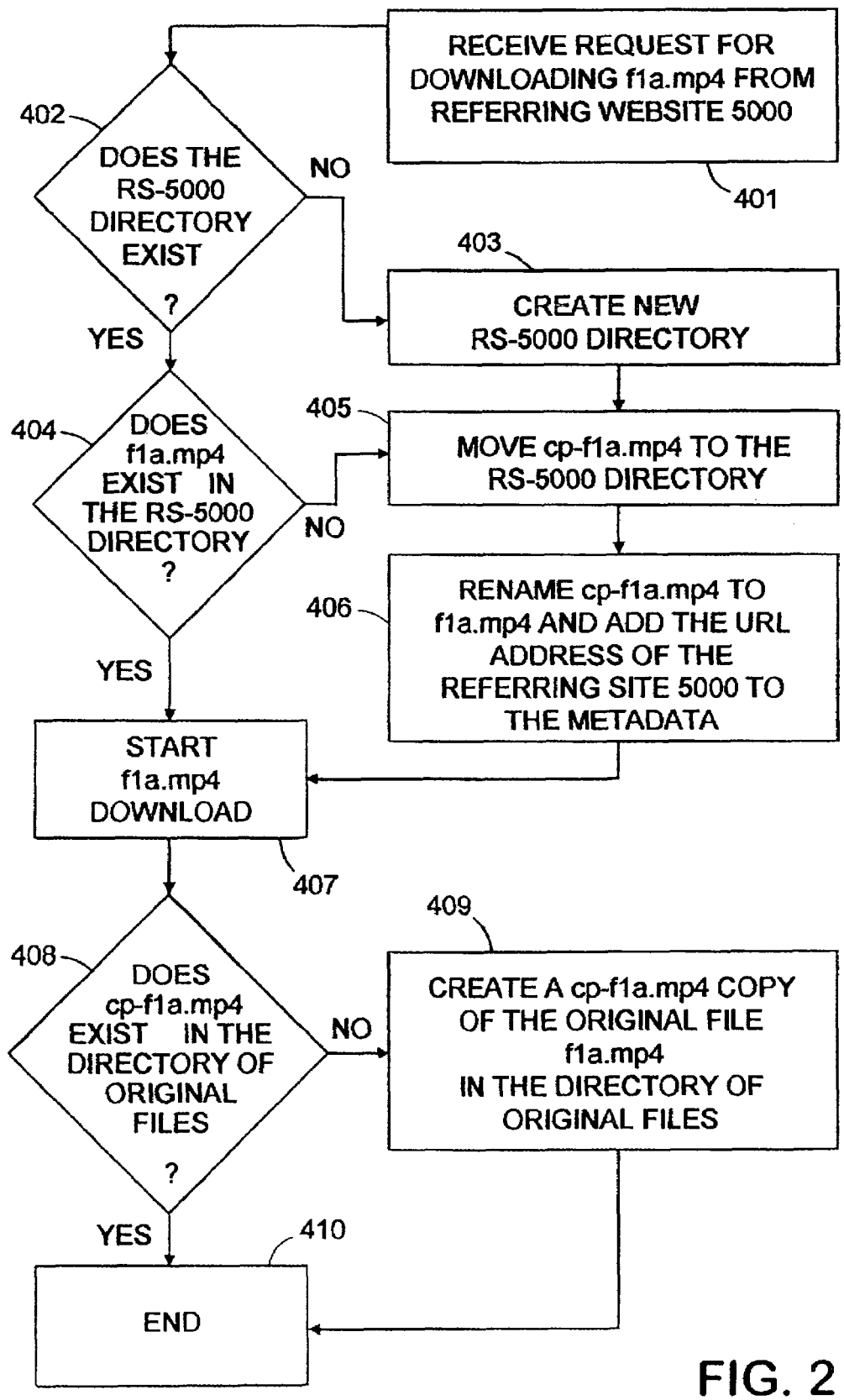
FIG. 2 is a block diagram illustrating, at a high level, an algorithm executed by a download application in a download site from which a file is downloaded, after a link to the file in a content provider has been activated.
Figure 3:
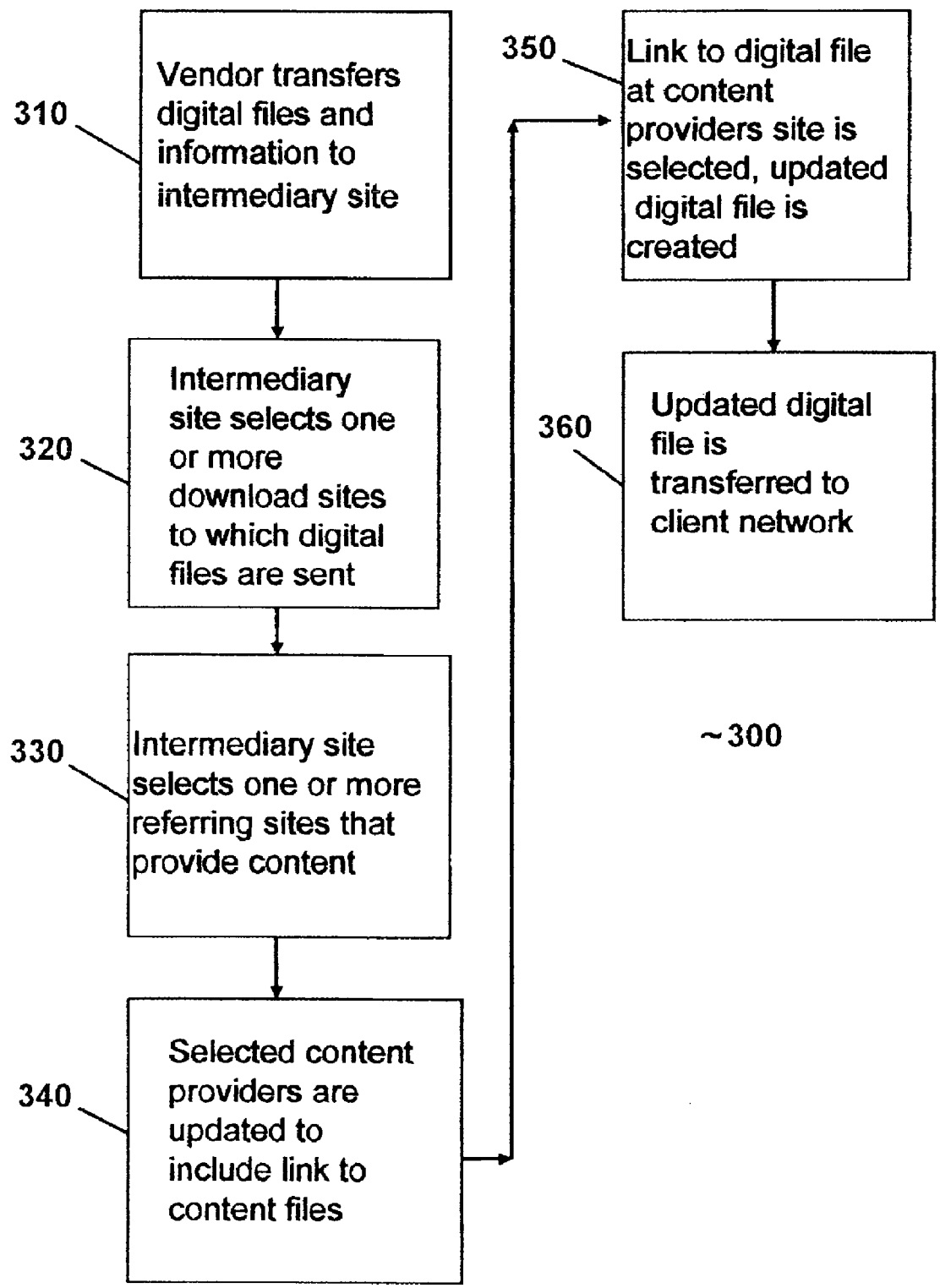
FIG. 3 is a flowchart of a process for distributing files, according to an embodiment of the invention.

Embodiments of the present invention and their advantages may be understood by referring to FIGS. 1-3, like numerals being used for like corresponding parts in the various drawings.

The block diagram of FIG. 1 schematically illustrates a system for applying a process of distributing digital files according to an embodiment of the invention. The system may comprise an equipment 5 of a user, an intermediary site 2, at least one content provider, e.g., referring site 9, which may be associated with intermediary site 2, and at least one vendor site 3. The system also may comprise at least one download site 4, and, optionally, one or more licensing sites 8. One or more of sites 2, 3, 4, 8 and 9 may be network websites, e.g., Internet network sites. In the embodiment shown in FIG. 1, a single referring site 9, a single vendor site 3, a single licensing site 8, and a single download site 4 are depicted. Nevertheless, the process may use a system which may comprise a substantial number of referring sites 9. For example, having a substantial number of referring sites 9 substantially may increase the number of Internet users attracted to referring sites 9, which may increase the number of digital downloads of files, and thereby may increase the number of purchases for the user.

According to an embodiment of the invention, and as shown in FIG. 1, sites 2, 3, 4, 8, 9, and user equipment 5 may be in on-line communications with each other, via connections, e.g., connections 152, 153, 154, 158, 159, 192, 132, 182, and 124.

FIG. 1 shows two digital files, 1a and 1b, which may be protected by intellectual property rights, and which may be distributed on-line as described further herein. In an embodiment of the invention, file 1a may comprise an audiovisual content file, and file 1b may comprise a software product. File 1a may comprise music, video, image or text content in digital format, or any combination thereof This content may be protected by copyright, and may be accessed, e.g., played or viewed, in the appropriate hardware or software, e.g., equipment 5 of a user. Files 1a and 1b may be any type of digital file which may be transferred over a network.

Equipment used by a user, e.g., equipment 5, may be a computer having a network, e.g., an Internet, connection. Nevertheless, equipment 5 could be any other equipment which may be configured to be connected to a data network, e.g., mobile telephones, digital players with the capability of connecting to a data network, or the like.

Equipment 5 also may comprise an operating system 51, in which a digital player 52a may be installed. Digital player 52a may comprise a Digital Rights Management (DRM) system. The DRM system may form a control application 53a which may be configured to detect whether the content of file 1a is protected by intellectual property rights. Control application 53a may check whether the user has a license for accessing the content and whether a user may use the license to allow a playing of the content of file 1a. In the DRM system, the content of the file may be encrypted, and the player may decrypt the content at the time the user plays the content. Specific functionalities of the control application 53a according to the invention will be explained in more detail further herein.

File 1b may be a file comprising a software product, e.g., a set of instructions which may be loaded into the memory of a computer and may be executed individually or in combination with another software product. File 1b may be any type of computer program, e.g., an installation program installing a program in a computer, a computer program update package, an installing file downloading a computer program on-line or an update thereof, a computer program library, other software products, or the like. In an embodiment of the invention, file 1b may be an executable file for installing a computer program 52b. The file 1b may be executed in the operating system 51 of the equipment 5, and may be configured to install program 52b. File 1b may include a component of a program 52b, forming a control application 53b which may be capable of detecting that the use of the program 52b is protected by intellectual property rights using connection 101 checking that the user has the suitable license for using program 52*b*, and using the license to allow the user to use the program.

In an embodiment of the invention, vendor site 3, which may be considering marketing digital files 1*a*, 1*b*, may register on-line 132 in an intermediary site 2. During the registration process 132, vendor site 3 may introduces identifying data, e.g., vendor name, address, e-mail, and/or the like. Vendor site 3 then may send files 1*a*, 1*b* to be marketed to the intermediary site 2 for distribution. Intermediary site 2 may have an intermediation application 20, e.g., a web interface, which may carry out the registration process and may store the registration information of vendor site 3 in a database 21. During the registration process, vendor site 3 also may provide intermediary site 2 with commercial information 11*a*, 11*b*. Commercial information 11*a*, 11*b* may be related to files 1*a* and 1*b*, respectively. Commercial information 11*a*, 11*b* may include, e.g., the sale price of each file 1*a*, 1*b*, the percentages or commissions that the vendor site 3 will pay for each sale, the category that each file 1*a*, 1*b* belongs to, e.g., software, music, movies, and the like. Commercial information 11*a*, 11*b* also may include a series of keywords associated with each file 1*a*, 1*b*, indicating the content of the file, and which may be used by intermediary site 2 to select referring sites 9 for each file 1*a*, 1*b*. Intermediary site 2 may store this information 11*a*, 11*b* in database 21.

Intermediary site 2 may enter contracts or agreements, or both, with one or more referring sites 9 and download sites 4, which may be interested in participating in the on-line distribution of digital files. Referring sites 9 and download sites 4 may receive a commission or percentage of the sale price of each file in return for participating in the distribution. Although FIG. 1 shows a single referring site 9 and a single download site 4 to facilitate the description, other embodiments of the invention may comprise a plurality of referring sites 9 or a plurality of download sites 4, or both. Referring site 9 may be configured to attract a group of users browsing the Internet, e.g., users who may be interested in the content 91 offered by referring site 9. The users visiting a webpage of referring site 9 may view advertisements 110*a*, 110*b*. By selecting the respective links 100*a* and 100*b*, users may download versions, e.g., trial or demonstration versions, of files 1*a* and 1*b*. Links 100*a*, 100*b*, may be a Uniform Resource Locator ("IRL"), and may link to an Internet site, e.g., a world wide web page.

Intermediary site 2 may select one or more referring sites 9 which may advertise the different files 1*a*, 1*b* to be marketed. Candidate sites, e.g., referring sites 9, may communicate on-line with intermediary site 2, and may carry out an on-line registration process. The on-line registration process may comprise the steps of providing referring site identifying information, e.g., name, address, telephone, e-mail, or the like, and of providing the Uniform Resource Locator ("URL") address of the referring site. During the registration process of referring site 9, intermediary site 2 optionally may request that referring site 9 provide a series of words or descriptions that may describe the content 91 of the referring site 9.

When referring site 9 ends the registration process in intermediary site 2, intermediary site 2 may provide referring site 9 with the code of an advertisement and link management application 92. Referring site 9 may add the advertisement code to its own webpage via a variety of methods, e.g., copying and pasting from the intermediary site 2, or the like. Link management application 92 may be, e.g., a code in Javascript, PHP, ASP.NET, or any other language capable of communicating with the intermediary site 2 by means of web services, e.g., collection of protocols and standards that are useful for exchanging data between websites through Internet. Advertisement and link management application 92 also may allow intermediary site 2 to modify, e.g., update, remove, or change, advertisements 110*a*, 110*b* and links 100*a*, 100*b*. This may optimize the efficiency of the referring sites 9 in terms of the number of downloads of files and of the number of sales.

Once the referring site 9 is registered, the intermediary site 2 may conduct analysis of referring site 9 in order to determine whether advertisement and link management application 92 may operate correctly, and also to analyze content 91 of referring site 9. The intermediary site 2 may count a number of times that each word appears in content 91 of referring site 9, and may select words which appear more times than a predetermined number of times, or as a higher percentage of total words than a predetermined percentage. This information may be stored by intermediary site 2 in its database 21.

Intermediary site 2 then may choose files 1*a*, 1*b* which may be most related to content 91 of referring site 9, according to the information in database 21. For example, a referring site related to video games may be particularly suitable for providing downloads of files containing video games. Another referring site which may be related to the accounting industry may be particularly suitable for providing downloads of accounting programs, and another referring site 9 related to music may be particularly suitable for providing music downloads. To chose which are the most suitable files 1*a*, 1*b* for each referring site 9, the intermediary site 2 compares the content information of the referring site 9 which it has stored in its database 21 with the commercial information 11*a*, 11*b* of the files 1*a*, 1*b* provided by the vendor site 3, and chooses, for each referring site 9, the files having the greatest degree of coincidence with the content information of the referring site 9.

When advertisement and link management application 92 is executed in a webpage of referring site 9, it may display advertisements 110*a*, 110*b* together with links 100*a*, 100*b*. When a visitor of the webpage of referring site 9 activates one of links 100*a*, 100*b*, a download of one or more files 1*a*, 1*b*, respectively, to user equipment 5, may occur. To optimize the number of downloads of files 1*a*, 1*b* and their possible sales, the intermediary site 2 may vary links 100*a*, 100*b* of each referring site 9. Further, intermediary site 2 may perform a statistical tracking and analysis of which sites may generate the most downloads and the most sales. The intermediary site 2 may track downloads of files 1*a*, 1*b* in each referring site 9 and of the purchases of use licenses for each file. This statistical information may be stored in database 21 of intermediary site 2. As will be discussed in more detail further herein, intermediary site 2 thus may relate historic sales with selected key words of each referring site 9, to establish for which files 1*a*, 1*b* a use license thereof may be more likely to be purchased.

For example, by multiplying the sale price of the use licenses for file 1*a*, 1*b* by the percentage of commission that referring site 9 may charge, and by accounting for a percentage of users who download a file and subsequently decide to purchase a use license for the file, intermediary site 2 may obtain a statistical estimation of a profit associated with referring site 9 with each selection of a link or each viewing of an advertisement of a file. Intermediary site 2 thus may update the links of a referring site 9 such that they advertise and point to files which may generate high earnings.

Another method that intermediary site 2 may use to select suitable files for each referring site 9 may include choosing files similar to those which are the most successful in another referring site 9 having a similar content 91. These selections may be manually executed, e.g., by a person carrying out statistical analysis, or by an algorithm which automatically tracks and updates the data.

When a user accesses a webpage of referring site 9 containing the advertisement and link management program 92 and activates one of links 100$a$, 100$b$, the download of associated file 1$a$, 1$b$, respectively, may start from a download site 4, respectively. Therefore, links 100$a$, 100$b$ may contain a URL address pointing to the corresponding file 1$a$, 1$b$ in download site 4. Files 1$a$, 1$b$ previously may have been delivered to download sites 4 by intermediary site 2. In order to receive files 1$a$, 1$b$ provided by the intermediary site 2 on-line, download sites 4 may use, e.g., FTP protocol. To that end, each download site 4 may receive a key for receiving files, e.g., a user name and a password or access key authorizing download site 4 to receive files from intermediary site 2.

In an embodiment, download sites 4 preferably may be different from referring sites 9, which may allow a user to download files 1$a$, 1$b$ from a download site 4 without placing undue burden on bandwidth or communication transmission rate of referring sites 9, and without affecting other users who may want to see content 91 of referring sites 9. Nevertheless, in another embodiment of the invention, download site 4 may be the same site as referring site 9, if referring site 9 has sufficient bandwidth for allowing users, e.g., Internet users, to consult its content 91 and at the same time download the files 1$a$, 1$b$.

In an embodiment of the invention, download identifying data may be incorporated into to files 1$a$, 1$b$ before they are downloaded by a user from an equipment 5, or at the time in which the download starts. The incorporation of download identifying data to files 1$a$, 1$b$ may be carried out in different ways. In an embodiment of the invention, download identifying data may be included as metadata of the files 1$a$, 1$b$. The metadata may be added prior to the download, or at the time of the download, and may be carried out in intermediary site 2 or partially in intermediary site 2 and in each download site 4, as will be discussed in more detail herein. The link 100$a$ may be configured to cause the adding of identifying information of referring site 9 to the digital file.

The metadata of a file may be data containing formal file information, e.g., the name, the size, the type of file, modification date, proprietor, and the like. Many files may have fields, e.g., reserved portions of the file, which may be empty, and which may be used as metadata-free fields to house the download identifying data. In other embodiments of the invention, new metadata fields or properties may be identified or added to a file, e.g., using a Dynamically Linked Library ("DLL"), e.g., the Microsoft DSOFile.dll library, and housing download identifying data therein. In an embodiment of the invention, in the Microsoft Windows environment, for example, these metadata may be viewed from the "File>Document Properties" menu in the Windows application graphical interface. The location containing these metadata in the file has several fields which are currently free. The process according to the invention advantageously uses these metadata-free fields to house therein the download identifying data. Download identifying data incorporated to files 1$a$, 1$b$ may comprise at least identifying data 19 of the referring site 9 in which the user has activated the link 100$a$, 100$b$ which led to the download. The identifying data 19, which may include the URL address of referring site 9, will allow the referring site 9 to be determined, in order to compensate referring site 9 for its participation in a download that resulted in a sale of a use license for the downloaded file 1$a$, 1$b$. The incorporation of the download identifying data in each digital file preferably consists of introducing said download identifying data as file properties metadata of said digital file.

In a preferred embodiment, a download management application is executed in the download site and receives the identifying data of the referring site and, when the user is redirected to said download site to download the digital file, said download management application incorporates the identifying data of the referring site to the digital file downloaded by said user. Furthermore, the download management application also preferably incorporates identifying data of the download site to said digital file. The identifying data of the referring site and the identifying data of the download site are preferably incorporated by the download management application to the digital file which is downloaded on-line as file properties metadata of said digital file.

Furthermore, download identifying data also may comprise identifying data 12 of the intermediary site 2, identifying data 13 of the vendor site 3 in which the user may purchase on-line use licenses for the content of files 1$a$, 1$b$, identifying data 14 of the download site 4 from which the file 1$a$, 1$b$ has been downloaded, and identifying data 18 of a licensing site 8 in which the user may activate the use licenses the user has purchased on-line. As shown in FIG. 1, identifying data 12, 13, 14 and 18 may comprise URL addresses of the intermediary site 2, of the vendor site 3, of the download site 4 and of the licensing site 8, respectively.

In an embodiment of the invention, before providing the files 1$a$, 1$b$ to download site 4, intermediary site 2 may incorporate all the download identifying data into files 1$a$, 1$b$. Intermediary site 2 then may deliver these files 1$a$, 1$b$ to download site 4 and also may send advertisements 110$a$, 110$b$ in the form of text or images relating to the files 1$a$, 1$b$ to the referring site 9, as well as links 100$a$, 100$b$ that the referring site 9 may publish in its webpage. When advertisement and link management program 92 of the referring site 9 receives advertisements and links, advertisement and link management program 92 may display the links on the web page.

Any user accessing referring site 9 through Internet may view advertisements 110$a$, 110$b$ of files 1$a$ and 1$b$. When one of links 100$a$, 100$b$ is selected in referring site 9, the download of corresponding file 1$a$, 1$b$ from the download site 4 may start, at which time file 1$a$, 1$b$ may incorporate download identifying data into itself in the form of metadata. In this embodiment, intermediary site 2 may deliver each of files 1$a$, 1$b$ with incorporated download identifying data, e.g., with identifying data 12, 13, 14, 18 and 19, to the download site 4. As an example, if 10,000 referring sites advertise a file 1$a$, and file 1$a$ may have a size of 50 megabytes, intermediary site 2 may incorporate download identifying data to 10,000 files, and send each of these files to the download site 4, which may store all of the files, which may occupy a space of 500 gigabytes.

In another embodiment of the invention, identifying data 19 of the referring site may not be incorporated into files 1$a$, 1$b$ by intermediary site 2, but rather by download site 4. In this embodiment of the invention, when a user activates one of links 100$a$, 100$b$ in the referring site 9, the link may include a URL address redirecting to download site 4, and the link also may include the URL address of referring site 9 itself, which may be transmitted to download site 4. This process may be executed, for example, by passing the information of the URL address of referring site 9 as a parameter in the URL address which directs the system from the webpage of referring site 9 to the webpage of download site 4. At download site 4, a download management application 40 may receive identifying data 19 of referring site 9, and may incorporate the identifying data into file 1a, 1b, e.g., by adding the identifying data 19 as metadata, such that the updated digital file may be downloaded by the user.

As shown in FIG. 2, a user may access referring site 9, which may be referring site number 5,000 (of 10,000, for example). The user may activate link 100a to download file 1a. Link 100a, which may have been prepared by intermediary site 2 and installed in referring site 9 by advertisement and link management program 92, may contain the URL address:

http://www.download-site.com/referring-site-5000/fla.mp4

The first part "www.download-site.com" may identify the URL address of download site 4. The second part, "referring-site-5000" may be a parameter identifying the URL address of the referring site number 5,000. The third and last part "fla.mp4" may identify the file 1a to be downloaded. Download site 4 may receive the download request for downloading the file 1a. Download site 4 then may execute download management program 40, which may examine the URL address. Download management program 40 may detect that the URL address comes from referring site 9 number 5,000. Upon making this determination, download management program 40 may add the following information to the metadata of the file 1a as identifying data 19 of referring site 9:

URL9=http://www.referring-site-5000.com

In this example, URL9 may be a label included in the metadata inserted into file 1a, which may allow other applications to obtain the URL address of the referring site 9 by reading the address from the metadata of file 1a. The URL9 label may be created in the metadata of file 1a by intermediary site 2, and download management application 40 may copy the URL address of the referring site 9 "http://www.referring-site-5000.com" into the URL9 label.

In this embodiment, intermediary site 2 may deliver a single copy of each file 1a, 1b to the download site 4, and may not need to send a plurality of files 1a, 1b equal to the number of referring sites 9 that may link to the file. Further, intermediary site 9 may not need to include identifying data 19 of referring site 9 in the download identifying data. Rather, this data may be inserted by download management application 40 at the time the data is inserted.

When download site 4 receives a redirection from a link 100a, 100b of a referring site 9, download management application 40 of referring site 9 may have prepared different copies of corresponding file 1a, 1b which was delivered by the intermediary site 2. Download management application 40 may have multiple copies of downloaded files 1a, 1b prepared. This may allow that, while one of the files is being downloaded, a process which may last a few seconds or a few minutes, the download management application 40 may not be able to modify the properties of the file being downloaded in order to accommodate a second download request, which may arrive before the completion of the first download of the file. If download management application 40 modifies the metadata of a file which is being downloaded to include the referring site for a second download before the first download has ended, this may cause the first download to fail, or a file with erroneous data may be downloaded.

If the size of the file is relatively small, the download management application 40 may make a copy of the file when the download request is made, modify the metadata of the copy, and send the file with the updated metadata. Nevertheless, if the file size is relatively large, the download management application 40 may take several seconds or minutes to make a copy of the file to modify the metadata. This copying process may induce a slowdown resulting from large overhead in copying the files.

In most modern operating systems, moving a file from one directory to another directory within the same disc may be a nearly instantaneous process which may require modifying the directory structure. This process of moving a file may be faster than creating a copy of the file at the time of the download. It therefore may be convenient for the download management application 40 to have several copies of the files 1a, 1b prepared beforehand. Download management application 40 may be able to adapt the number of copies of each particular file 1a, 1b corresponding to the download statistics of the file.

As shown in FIG. 2, a user may access referring site 9 number 5,000 and may activate link 100a to download file 1a. Download management application 40 in the download sites 4 may receive a download request (step 401) for downloading file 1a, as set forth above. Download management application 40 also may check (step 402) if there is a directory attributed to referring site 9 number 5,000 in a hard disk of the download site 4. If not, download management application 40 may create the directory (step 403) which may be called, e.g., "RS-5000", and may be associated with the URL address "http://www.download-site.com/referring-site-5000". If the directory exists, download management application 40 may check if the directory contains file 1a (step 404), which in this example may be named "fla.mp4". If the directory does not contain the file, or if the directory has just been created in step 403, then download management application 40 may move one of the copies of the original file 1a (step 405), which may be stored in a directory of original files containing the files delivered by intermediary site 2, to the directory "RS-5000".

The copy of the original file 1a may be named "cp-fla.mp4". Then, download management application 40 may rename the file "cp-fla.mp4", to have the same name as the original "fla.mp4" file (step 406), and may copy the URL address of the referring site 9 in the URL9 label of the metadata of the "fla.mp4" file. As set forth above, the URL address of the referring site 9 previously may have been received by the download management application 40 as a parameter of the URL address contained in the link which was activated in the referring site 9. Once this information has been copied in the URL9 label of the metadata of the "fla.mp4" file, the user may start the file download (step 407). The download management application 40 then checks 408 if there are copies of the original file 1a in reserve, e.g., if there are any files called "cp-fla.mp4" in the directory of original files. If no copies of the file are present, download management application 40 may create one or several "cp-fla.mp4" copies of the original "fla.mp4" file in the directory of original files (step 409). If the copy of the file already exists, the algorithm ends (step 410). If the copy of the file does not exist, the algorithm ends after the copy is created (step 410).

Once the user has downloaded the files 1a or 1b, the files may be used in the equipment 5 of a user, e.g., in a digital player 52a or a computer program 52b. Files may be used with a control application 53a, 53b. Files 1a, 1b, which may be downloaded by the user, may include use limitations. The use limitations may allow the user to use the files in a limited manner until the user purchases a use license. For example, if the downloaded file is a computer program, e.g., file 1b, the limited use may comprise a time limitation of a predetermined duration, e.g., 30 days. After the 30 trial days, the user may purchase a use license for the program. If the downloaded file is an audiovisual content file, e.g., file 1a, the limited use may allow the user to listen to the music for a predetermined number of times, or allow the user to listen to a predetermined part of the music. Restrictions for other files 1a comprising any other digital content, for example digitalized books, can be established in the same manner.

Any known DRM may be used in an embodiment of the invention in order to protect the file contents from unauthorized use. When the user purchases the rights to use a file 1a, 1b, the control application 53a, 53b may request billing data and a credit card number from the user, and may send data, including billing data, to vendor site 3 by means of online communication, e.g., web services. In return, the user may receive a use license for the file. Control application 53b, 53b may know the URL address of the vendor site 3, since the information may be contained in the identification data 13 located in files 1a, 1b, which control application 53b, 53b may access locally.

At the time of carrying out the purchase, the control application 53a, 53b may send on-line 152 the identifying data 19 of the referring site 9, the identifying data 13 of the vendor site 3 and the identifying data 14 of the download site 4 to the intermediary site 2, and may include the URL addresses of referring site 9, vendor site 3, and download site 4. The intermediary site 2 thus may compensate the referring site 9 and the download site 4 for participation in the process which led to the purchase of a use license. Further, intermediary site 2 may charge vendor site 3 an amount corresponding to the compensation of referring site 9 and download site 4, as well as a commission for involvement as an intermediary site 2.

In another embodiment of the invention, once the purchase has been carried out, the control application 53a, 53b also may send identifying data 19, 13 and 14 to the other participating sites, e.g., referring site 9 and download site 4. To that end, control application 53a, 53b may use known services, e.g., web services of referring sites 9 and download sites 4.

The processes of purchasing and activating a use license for a digital file are substantially similar for both an audiovisual content file 1a and a file 1b containing a computer program. In an indirect sale process, e.g., the purchase of the use license may be carried out in the vendor site 3, and the activation of the license may be carried out in a licensing site 8 different from vendor site 3. In a direct sale process, the activation of the license may be carried out in the same site as vendor site 3.

The file 1b which has been downloaded by a user according to the described process may be a program for installing a computer program 52b. When the file 1b is executed in the operative system 51 of an equipment 5, the program 52b may be installed in equipment 5 and may be used in a limited manner as long as a use license has not been purchased and activated. The program 52b may incorporate a component 53b, which may include a control application configured to detect whether the use of the program 52b is protected by intellectual property rights, check whether the user has the suitable license for using program 52b, and using the license for allowing the use of the program. Furthermore, when the user acquires a use license for the program 52b the component 53b may manage the purchase and activation of the use license on-line, as set forth below.

To carry out the on-line purchase of the use license, the component 53b may locally access the download identifying data, e.g., the identifying data 12, 13, 14, 18 and 19. In an embodiment of the invention, when the file 1b is executed to install the program 52b, the installation program reads the download identifying data in the file 1b and stores it locally in equipment 5.

Component 53b may display a link to the URL address of the vendor site 3 and may allow the user to set up communication through the browser of his or her equipment 5. Instead of setting up direct communication with the licensing site 8, the component 53b optionally may use indirect communication with the intermediary site 2 to connect to licensing site 8 or vendor site 3.

To activate the license which has been purchased, the component 53b locally may access (via an internal link 156) hardware identifying data 56, e.g., the serial number of the hard disk in which the program 52b is installed, of hardware in equipment 5. Component 53b then may set up communication 158 with the licensing site 8 and may commence a license activation session. For example, component 53b may send the hardware identifying data 56 and the purchase receipt, and in turn, component 53b may receive a license file including hardware identifying data 56, such that the license file is valid for using the program 52b in equipment 5. Any public/private key system or other encryption system may be used to ensure that the license file is valid for using program 52b in equipment 5.

Once a use license for a file 1a or 1b is purchased, the vendor site 3 may pay commissions to the referring site 9, to the download site 4 and to the intermediary site 2. The payment may be carried out directly by the vendor site 3 or through the intermediary site 2. In the latter case, the intermediary site 2 may charge the vendor site 3 for the commissions, including a commission for the intermediary site 2 itself, and the intermediary site 2 may carry out the payment to the referring site 9 and to the download site 4.

The intermediary site 2 optionally may allow a predetermined amount of time to elapse to prevent a chargeback or a return of payment by credit card, and subsequently may pay the commissions corresponding to the referring site 9 and to the download site 4. This waiting period may reduce fraud, e.g., fraudulent credit card payments.

The process according to the invention is compatible with different download technologies, such as a torrent file transfer protocol. In one embodiment of the invention, instead of directly downloading a complete file 1a, 1b from the download site 4, the user may download a locator file, e.g., a "torrent" from download site 4. This file may contain information about locating nodes on a network, e.g., the Internet, which already may have downloaded file 1a, 1b or parts thereof and which may be useful as a source for downloading file 1a, 1b in parallel from a plurality of the nodes. In this case, the download identifying data, which in this example may be formed by the data 12, 13, 14, 18 and 19, are incorporated as metadata of the locator file. The control application 53a, 53b may read the download identifying data in the locator file.

The torrent file download application may download a torrent file which may be updated at download site 4 to include the metadata in file 1a, 1b. When the torrent file is downloaded to equipment 5, the metadata may be extracted and stored in equipment 5.

In another embodiment of the invention, a Torrent file download application, e.g. "BitTorrent"™ may be executed in the computer 5 of the user, and may read said download identifying data in the Torrent file and include the download identifying data as metadata in the file 1a, 1b which has been downloaded. In this embodiment, the metadata may be downloaded to and stored in the computer's memory as soon as the locator file is downloaded, which may allow discarding of the locator file once the download of file 1a, 1b is complete. Thereby, it may be possible to use standard processes, such as those described above, to purchase and activate a use license, independently of whether the 1a, 1b has been downloaded directly or by means of a locator file.

FIG. 3 describes a method of transmitting a digital file 300 according to an embodiment of the invention. In step 310, a vendor site 3 which may be interested in marketing digital files 1a, 1b, may register on-line 132 in the intermediary site 2. This registration may include transmitting digital files 1a, 1b to the intermediary site 2, as well as sending information regarding the digital files 1a, 1b to be stored in database 21 of intermediary site 2, as described above. In step 320, intermediary site 2 may select one or more download sites 4 to which digital files 1a, 1b may be transmitted. These download sites 4 may be linked to referring sites 9, but also may be separate from referring sites 9. Before transferring digital files 1a, 1b to download site 4, intermediary site 2 may add metadata to the digital files as described above.

In step 330, intermediary site 2 may select one or more referring sites 9 to display advertisements 110a, 110b which include links 100a, 100b to download one or more files 1a, 1b. Referring sites 9 may be selected at random, or they may be selected based on information about the files 1a, 1b, stored in the database 21, and information about referring sites 9 stored in the database 21. In an embodiment of the invention, one or more keywords may be associated with the digital files 1a, 1b, and these keywords may be used to match referring sites 9 which have similar content. In another embodiment of the invention, referring sites 9 may be selected based on a number of use licenses which ultimately were sold from downloads made on referring sites 9. In this embodiment, intermediary site 2 may consider overall use license sales for all files, or may consider use license sales for files only related to digital files 1a, 1b.

In step 340, intermediary site 2 may update content of a selected referring site 9 to provide links 100a, 100b, to download digital files 1a, 1b. Intermediary site 2 may update the referring site 9 directly, or intermediary site 9 may use advertisement and link management program 92 to update referring site 9. In step 350, the links 100a, 100b, may be selected. This may cause the digital files 1a, 1b, stored at download site 4, to be updated, by adding metadata which identifies referring site 9 to the digital files 1a, 1b. This process may be carried out by the intermediary site 2, or it may be carried out by download management application 40. In step 360, the updated file may be transmitted to the user network, e.g., to equipment 5, at which point the limited use of the file may be activated by the user.

When the file is activated by the user, information stored in the file may be transferred back to intermediary site 2, or to vendor site 3, or both. This identification may identify the referring site 9 which stored the links 100a, 100b, which were selected and which caused digital files 1a, 1b to be downloaded to the user's computer. The transfer to intermediary site 2 may occur when the user elects to purchase a service associated with the digital files 1a, 1b, e.g., a use license or the like. The use license may be transferred to user equipment 5.

Information sent from user equipment 5 may be stored in database 21 of intermediary site 2. This information may be used to compensate referring site 9. The information also may be used by intermediary site 2 to assist in selecting referring sites 9 to provide links to new digital files 1a, 1b. In an embodiment of the invention, when a vendor site 3 sends content, e.g., files, to intermediary site 2, intermediary site 2 may select one or more referring sites 9. Intermediary site 2 may select one or more referring sites 9 based on information stored in the database 21.

For example, in an embodiment of the invention, each digital file 1a, 1b may be associated with at least one word. The at least one word may be provided by the vendor site 3, or it may be selected by intermediary site 2. Once this word or words is selected, the word is compared to information about each referring site 9 stored in database 21. This information may be collected by the intermediary site, either by automated or manual processes, or the information may be transmitted to the intermediary site 2 by the vendor site 3. As the intermediary site 2 searches database 21, intermediary site 2 may make associations between the at least one word and the content stored in the database 21 of each referring site 9. The intermediary site 2 may select one or more referring sites 9 based on these associations between the at least one word and the content stored in the database 21. In another embodiment of the invention, each time a sale is made, e.g., a use license is purchased, the investment site 2 credits referring site 9 for the sale, and database 21 of intermediary site 2 may be updated to include information about a selection of a link at referring site 9 leading to a sale. This may allow intermediary site 2 to record the referring sites 9 which lead to higher sales of use licenses, whether generally, or for a specific subset of files. These referring sites 9 may be designated as preferred content providers, and they may be selected by the intermediary site to host links 100a, 100b, and advertisements 110a, 110b. In another embodiment of the invention, intermediary site 2 selects referring sites 9 only from a list of preferred referring sites 9.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples are considered as exemplary of the claimed invention, the scope of which is indicated by the following claims.

The invention claimed is:

1. A process for distributing files, the process comprising the steps of:
  receiving from a vendor site at least one digital file that has a metadata-free field;
  transmitting the at least one digital file to a predetermined location;
  selecting at least one content provider;
  updating a content of the at least one content provider to provide a reference to the at least one digital file at the predetermined location;
  generating at least one updated digital file by adding information which identifies the at least one content provider to the metadata-free field of the at least one digital file when the reference to the at least one digital file is selected at the content provider, the metadata-free field not residing in a file wrapper; and
  transmitting at least a portion of the at least one updated digital file which includes the information which identifies the at least one content provider to a client network.

2. The process of claim 1, further comprising the step of receiving the information which identifies the at least one content provider when the client network engages in at least one activity associated with the transmitted updated digital file.

3. The process of claim 2, wherein the at least one activity comprises purchasing at least one service associated with the transmitted updated digital file.

4. The process of claim 2, wherein the at least one activity comprises receiving content associated with the transmitted updated digital file.

5. The process of claim 2, further comprising the step of transmitting compensation to the at least one content provider based on the at least one activity.

6. The process of claim 2, further comprising the step of storing the information which identifies the at least one content provider in a database, wherein the step of selecting at least one content provider comprises the substep of selecting the at least one content provider based on the information stored in the database.

7. The process of claim 2, further comprising the step of storing the information which identifies the at least one content provider in a database, wherein the step of selecting at least one content provider comprises the substeps of:
   generating at least one word associated with the at least one digital file;
   analyzing the content of a plurality of content providers; and
   selecting the at least one content provider from the plurality of content providers based on an association between the at least one word and the content of the at least one content provider.

8. The process of claim 2, further comprising the step of storing the information which identifies the at least one content provider in a database, wherein the step of selecting at least one content provider comprises the substeps of:
   analyzing information stored in the database to determine a plurality of preferred content providers which appear in the database more than a predetermined number of times; and
   selecting the at least one content provider from the plurality of preferred content providers.

9. The process of claim 1, wherein the steps of receiving, transmitting the at least one digital file, selecting, and updating are carried out at a particular location, and the particular location is associated with the predetermined location.

10. The process of claim 9, wherein the particular location and the predetermined location are world wide web sites.

11. The process of claim 1, wherein the steps of receiving, transmitting the at least one digital file, selecting, and updating are carried out at a particular location, and the particular location is associated with the at least one content provider.

12. The process of claim 1, wherein at least one of the steps of receiving, transmitting the at least one digital file, selecting, and updating are carried out via the Internet.

13. The process of claim 1, wherein the reference to the at least one digital file comprises a Uniform Resource Locator.

14. The process of claim 1, wherein the step of receiving at least one digital file comprises the substep of receiving the at least one digital file from a vendor, and the step of generating the at least one updated digital file comprises the substep of adding information to the at least one digital file which identifies the vendor.

15. The process of claim 11, wherein the substep of adding information comprises the substep of incorporating metadata which identifies the at least one content provider to the at least one digital file.

16. A process for distributing files, the process comprising the steps of:
   receiving from a vendor site at least one digital file that has a metadata-free field;
   transmitting the at least one digital file to a predetermined location;
   selecting at least one content provider; and
   updating a content of the at least one content provider to provide a reference to the at least one digital file at the predetermined location, wherein the reference is configured, such that when the reference is selected by a client network, the reference activates a program which causes:
   at least one updated digital file to be generated by adding information identifying the at least one content provider to the metadata-free field of the at least one digital file, the metadata-free field not residing in a file wrapper; and
      the updated digital file which includes the information which identifies the at least one content provider to be transmitted to the client network.

* * * * *

UNITED STATES PATENT AND TRADEMARK OFFICE
CERTIFICATE OF CORRECTION

PATENT NO. : 7,747,466 B2 Page 1 of 1
APPLICATION NO. : 12/107028
DATED : June 29, 2010
INVENTOR(S) : Alvaro Fernandez It is certified that error appears in the above-identified patent and that said Letters Patent is hereby corrected as shown below:

Title page Item (30) should read

(30) Foreign Application Priority Data
Apr. 4, 2007 (ES) .................ES 200700900

Signed and Sealed this

Twenty-fourth Day of August, 2010

David J. Kappos
*Director of the United States Patent and Trademark Office*